United States Patent [19]

Eriksson

[11] Patent Number: 5,108,290
[45] Date of Patent: Apr. 28, 1992

[54] APPARATUS FOR DISPLAYING LETTERS OR PICTURES

[76] Inventor: Bror A. Eriksson, Novanik AB, Box 277, S-651 08 Karlstad, Sweden

[21] Appl. No.: 595,567

[22] Filed: Oct. 11, 1990

[30] Foreign Application Priority Data

Oct. 16, 1989 [SE] Sweden .............................. 8903379-9

[51] Int. Cl.⁵ .............................................. G09B 21/00
[52] U.S. Cl. .................................... 434/114; 434/113; 400/122
[58] Field of Search .................... 434/113, 114; 101/4; 400/122

[56] References Cited

U.S. PATENT DOCUMENTS

| | | | |
|---|---|---|---|
| 3,736,672 | 6/1973 | Skewis et al. | 434/114 |
| 3,966,273 | 6/1976 | Hagen et al. | 312/345 |
| 4,445,871 | 5/1984 | Becker | 369/47 |
| 4,551,102 | 11/1985 | Meinzer | 434/114 |
| 4,571,190 | 2/1986 | Zagler et al. | 434/114 |
| 4,586,904 | 5/1986 | Chlunsky | 434/114 |
| 4,650,352 | 3/1987 | Eriksson | 400/122 |

Primary Examiner—Richard J. Apley
Assistant Examiner—Karen Richard
Attorney, Agent, or Firm—Nixon & Vanderhye

[57] ABSTRACT

An apparatus for displaying patterns of balls forming a Braille-sign or other symbol or picture, comprise a driven running belt carrying the balls with it. According to the invention the belt is smooth—instead of being perforated—whereby the balls may be grouped upon the belt in arbitrary mutual positions. The balls are kept in place by being clamped against said belt by means of a second belt and due to the spaces between the two belts being maintained at a reduced air pressure.

11 Claims, 2 Drawing Sheets

APPARATUS FOR DISPLAYING LETTERS OR PICTURES

The invention relates to an apparatus (show board) for running exposition of letter text or pictures represented by balls or small objects which are moved across an exposition area by means of a continuously or intermittently running belt. When the balls, which beforehand have been arranged in a pattern representing the picture or text content, pass over the exposition area, they will be accessible for reading visually or by the tactile sense. Particularly, the invention relates to an aid for people with visual defects to perceive letter text and/or picture text the balls being grouped so as to be felt and read by the finger tips, the original picture first being converted into a configuration of points and the balls being placed upon the belt in correspondence to said picture points or at least some of them. Usually the picture elements are coded, and for characters the Braille code may be used comprising symbols formed by a matrix with positions for 2×3 or 2×4 points and wherein the interpretation depends upon which positions are unoccupied.

In similar known apparatuses the balls are advanced across the exposition area by means of an endless perforated belt, and the balls are kept in place by being inserted wholly or partly into holes in the belt. In order to have an exposition area of a reasonably great size, a belt is required having tens of thousands of closely arranged holes. Such a belt is difficult to manufacture with the required precision and strength.

The object of the present invention is to create an apparatus of the above-mentioned kind which is more universal and not bound to any definite grouping of the balls upon the belt, and which also is of a simpler design. According to the invention said object is realized in principle by making the belt smooth, i.e. without any holes, depressions or similar which decide the possible location of the balls thereupon. Instead, according to the invention the balls are held in place by being clamped in the interspace between two parallelly running belts. The essential characteristic features of the invention are more closely set forth in the following claims. A preferred embodiment of the apparatus according to the invention is described below, reference being had to the attached drawing showing a side elevation of the apparatus.

Figure 1:
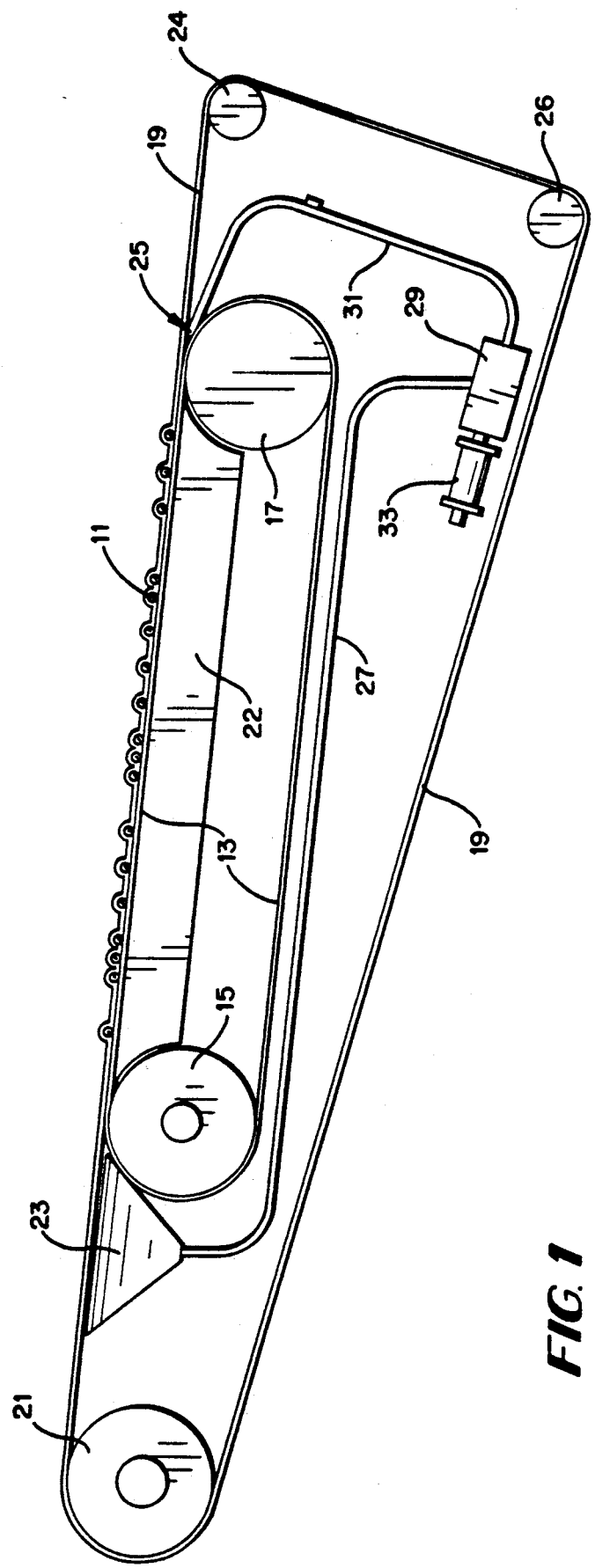
FIG. 1 is a side view in partially schematic form, illustrating the apparatus in accordance with this invention.

In the drawings, small balls 11 are shown resting upon the upper run of an endless belt (or sheet) 13 stretched between two similar horizontal rolls 15, 17 located approximately at the same level. At least one of the rolls is connected to a driving motor which moves the belt continuously or intermittently to the left in the drawing, e.g. under the control of a computer.

Around the belt 13 there is trained an also endless loop of a second belt 19, which is stretched between a driven roll 21 and two other rolls 24, 26. A portion of the upper run of said second belt extends immediately above the portion of the first belt 13 situated between the rolls 15, 17 and is separated therefrom mainly at places only, where balls 11 are placed. Both belts are stretched and are driven with the same speed, so that the balls situated between them are carried along without rolling, thus keeping their relative positions. Below the upper run of the first belt, forming the exposition area where the balls are accessible for reading, there is inserted a suction box 22 supported by housing structure (not shown) on opposite sides of the apparatus and connected to a fan maintaining a subatmospheric pressure in the interior of the suction box. The lengthwise and crosswise extending upper edges of the suction box are shaped as sealing strips, against which the belt slides and which delimit a rectangular area of the lower face of the belt. The belt 13 is pervious, so that the vacuum propagates into the space between the two belts 13, 19, wherein the balls are confined. Due thereto the second belt 19 is pressed against the ball tops with a greater force than that caused merely by the stretch of the belts. This means an additional guarantee for having the balls carried along with maintained mutual positions. The outermost belt 19, which preferably is made thinner and more resilient than the innermost belt 13, will between the balls be locally extended and also pressed down, in many places as far as into contact with the lower belt, and will contact parts of the sloping side faces of the balls, whereby the positions of the balls are further stabilized.

Thus, due to the belt 13 being pressed down around the balls, the parts thereof contacting the tops of the balls will protrude upwardly and form a corresponding pattern of embossments on the upper side of the belt 19 which can be sensed by the finger tips of visually disabled people and, of course, also are readable by seeing people. For the latter purpose the belt 19 should preferably be made translucent and the belt 13 black or coloured, so that the balls appear by contrast effect.

The outer belt 19 should be thin and resilient in order to allow the described deformation. A thin sheet of rubber or any plastic stuff would be preferred. The lower belt 13, which should be pervious in order to allow air evacuation of the interspaces between the belts, should have a surface structure which is substantially smooth or provided with merely tiny depressions situated close to each other at a mutual distance which is merely a fraction of the diameter of the balls, e.g. less than a tenth thereof, whereby there is hardly any restrictions of the possible positions of the balls upon the belt. The belt 13 may be manufactured from rubber material having very fine through pores, but a belt of textile material, e.g. a closely woven cloth, would be preferable. Along their lengthwise edges, where no balls are present, the two belts are sealed by being sucked together into engagement with each other. The sealing may be further improved by reinforced belt edges or by separate running seal bands. The sealing of the vacuum space in the transverse direction of the belts is had by similar engagement by suction at the fore and aft edges of the suction box.

According to a modified embodiment the suction may be applied at the sides of the belts or at the gaps where they meet or separate from each other. In those cases the belt 13 may be impervious and smooth, but it may also be rough in order to hamper rolling of the balls.

At the roll 15 the belts separate from each other and the balls are collected first in a hopper 23, the edge of which touches the belt 13 along its downwardly sloping path upon the roll 15. From the hopper 23 the balls are returned in a continuous circulation via separate paths each comprising an outlet nozzle 25, a passage or conduit 27, a feeding mechanism 29 and a second passage or conduit 31. A certain amount of balls moves in a closed path through said passages and then along the exposition area between the two contacting belts. The conduits 27, 29 are filled with balls in close contact. A varying quantity of balls is kept in reserve in the hopper 23.

Figure 2:
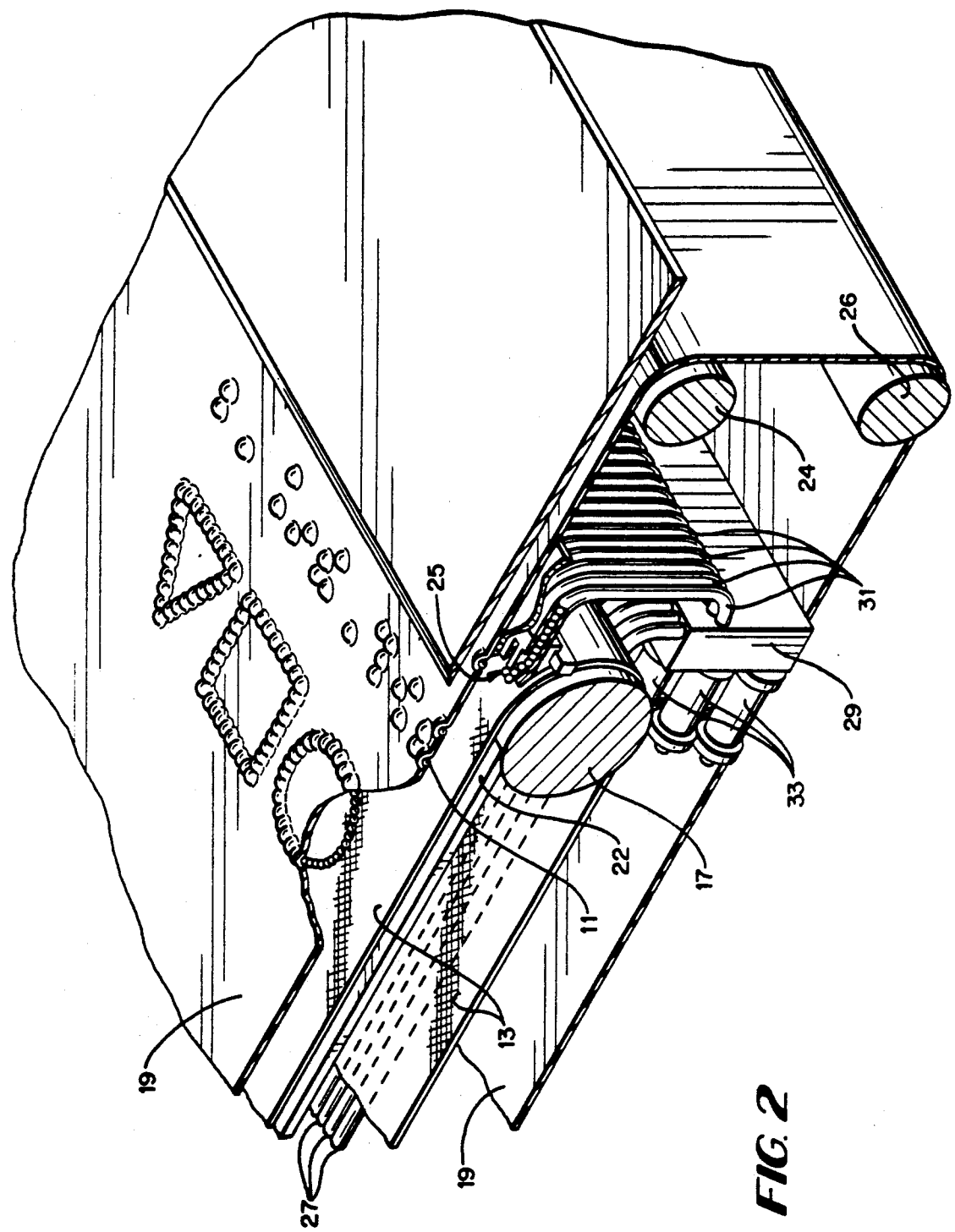
FIG. 2 is a partial perspective view of the apparatus shown in FIG. 1.

The feeding mechanism 29 comprises a piston driven by an electromagnet 33, and for each stroke thereof the ball lying foremost in the conduit 31 is pushed on, displacing the balls in front thereof and ejecting the outermost ball through the outlet nozzle 25, which is inserted in the gap where the belts are brought into mutual contact. The electromagnet is by a computer caused to operate with such intervals that the balls are spaced in the exposition area as is determined by the text or picture original meant to be exposed. The belts are of a width of about the same size as the length of the exposition area between the rolls 15, 17, leaving space for a number of ball rows at the side of the row shown in FIG. 1. In order to form said rows of balls the feeding mechanism 29 and connected conduits 27, 31 are duplicated as shown in FIG. 2, and in the gap between the meeting belts there is a plurality of outlet nozzles 25 situated close to each other on a line perpendicular to the moving direction of the belts. As an alternative, one or more nozzles 25 may serve for inserting balls in two or more rows at the side of each other, in which case the nozzle or nozzles are made displaceable in the transverse direction of the apparatus under the control of a computer or similar.

The above description explains merely the essential characteristics of the invention, and it is understood that the design shown in the drawing may be modified and completed in various respects within the framework set forth in the following claims.

What is claimed is:

1. An apparatus for displaying patterns of small balls, comprising a movable first belt trained in an endless loop and adapted for carrying balls placed on its outer face across an exposition area, a second belt stretched close to and alongside the outer face of a straight part of said first belt, each of said first and second belts being imperforate, said second belt being movable with the same speed as said first belt, and means for feeding balls into the gap between the two belts at the spot where they meet so as to have the balls grasped between them and then carried along and confined in the interspace between the belts.

2. An apparatus as claimed in claim 1, wherein the second belt is resilient and deformable to let the ball tops form a corresponding pattern of embossments on the outer face of said belt, suitable for perception by the human senses.

3. An apparatus as claimed in claim 1, wherein said first belt is smooth and pervious.

4. An apparatus as claimed in claim 1, further comprising means for evacuation of the interspace between the belts.

5. An apparatus as claimed in claim 1, wherein the surface of said first belt is rough.

6. An apparatus as claimed in claim 5, wherein the said first belt is pervious to air through pores therein of a size less than a tenth of the diameter of the balls.

7. An apparatus as claimed in claim 1, further comprising means for maintaining a subatmospheric pressure in the interspace between the belts.

8. An apparatus as claimed in claim 7, wherein a suction box is positioned within the loop of the first belt and provided with sealing edges applied against the inner face thereof.

9. An apparatus as claimed in claim 1, further comprising means for collecting balls at a spot where the two belts separate from each other and for returning them to said gap via passages comprising a ball feeding mechanism.

10. An apparatus as claimed in claim 9, wherein the ball returning passages end in said gap with a plurality of stationary outlets located on a line perpendicular to the moving direction of the belts.

11. An apparatus as claimed in claim 9, wherein at least one of the ball returning outlets in said gap is displaceable in the transverse direction of the belts.

* * * * *